United States Patent
Tanaka et al.

(10) Patent No.: US 11,021,202 B2
(45) Date of Patent: Jun. 1, 2021

(54) POSITION LIGHT-INTEGRATED BLINKER APPARATUS

(71) Applicant: HONDA MOTOR CO., LTD., Tokyo (JP)

(72) Inventors: Takuro Tanaka, Wako (JP); Yuki Kanemura, Wako (JP); Yuta Hosoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/730,001

(22) Filed: Dec. 30, 2019

(65) Prior Publication Data

US 2020/0231238 A1    Jul. 23, 2020

(30) Foreign Application Priority Data

Jan. 23, 2019   (JP) .............................. JP2019-009770

(51) Int. Cl.

| F21S 43/241 | (2018.01) |
|---|---|
| B62J 6/055 | (2020.01) |
| F21S 43/249 | (2018.01) |
| F21S 43/245 | (2018.01) |
| F21S 43/239 | (2018.01) |

(52) U.S. Cl.
CPC ............. B62J 6/055 (2020.02); F21S 43/239 (2018.01); F21S 43/245 (2018.01); F21S 43/249 (2018.01)

(58) Field of Classification Search
CPC .......... F21S 43/20; F21S 43/26; F21S 43/241; F21S 43/249; F21Y 2103/33
See application file for complete search history.

(56) References Cited

U.S. PATENT DOCUMENTS

| 5,984,497 A | * | 11/1999 | Foerstner ............. | B60Q 1/0011 |
|---|---|---|---|---|
| | | | | 362/511 |
| 6,107,916 A | * | 8/2000 | Beck .................... | B60Q 1/0041 |
| | | | | 340/468 |
| 6,471,368 B1 | * | 10/2002 | Lin .......................... | F21S 43/14 |
| | | | | 362/216 |
| 6,619,829 B1 | * | 9/2003 | Chen ..................... | F21S 43/245 |
| | | | | 362/544 |
| 6,641,295 B1 | * | 11/2003 | Hu ........................ | B60Q 1/0052 |
| | | | | 362/545 |

(Continued)

FOREIGN PATENT DOCUMENTS

| JP | 2008-087755 A | 4/2008 |
|---|---|---|
| JP | 2012-121526 A | 6/2012 |
| JP | 2016-035855 A | 3/2016 |

OTHER PUBLICATIONS

Office Action dated Nov. 18, 2020 in corresponding Japanese Patent Application No. 2019-009770 with the English translation thereof.

*Primary Examiner* — Julie A Bannan
(74) *Attorney, Agent, or Firm* — Carrier Blackman & Associates, P.C.; Joseph P. Carrier; William D. Blackman (57) ABSTRACT

A position light-integrated blinker apparatus for a saddle riding vehicle with improved visibility a blinker-light light source; position-light light sources; and a housing which houses both the blinker-light light source and the position-light light sources. A position light light-emitting region formed by illumination of the position-light light sources surrounds a blinker light light-emitting region formed by illumination of the blinker-light light source.

9 Claims, 10 Drawing Sheets

(56) References Cited

U.S. PATENT DOCUMENTS

| | | | | |
|---|---|---|---|---|
| 6,657,393 | B2* | 12/2003 | Natsume | F21S 43/15 |
| | | | | 315/82 |
| 6,789,929 | B1* | 9/2004 | Doong | B60Q 1/0052 |
| | | | | 362/511 |
| 7,097,336 | B2* | 8/2006 | Lin | F21V 13/04 |
| | | | | 362/544 |
| 7,726,862 | B2* | 6/2010 | Lin | G02B 6/0011 |
| | | | | 362/555 |
| 8,246,228 | B2* | 8/2012 | Ko | H01H 13/83 |
| | | | | 362/559 |
| 8,272,753 | B2 | 9/2012 | Kitajima et al. | |
| 9,523,477 | B2* | 12/2016 | Lin | F21S 43/241 |
| 9,562,672 | B2* | 2/2017 | Jorgensen | F21V 17/02 |
| 9,995,463 | B2* | 6/2018 | Kjeldsen | F21V 13/02 |
| 2012/0051077 | A1* | 3/2012 | Arai | F21S 43/249 |
| | | | | 362/516 |
| 2013/0051050 | A1* | 2/2013 | Yang | F21S 43/245 |
| | | | | 362/516 |
| 2014/0016336 | A1* | 1/2014 | Takenaka | F21S 43/14 |
| | | | | 362/473 |
| 2017/0015378 | A1* | 1/2017 | Takakuwa | F21S 43/14 |

* cited by examiner

POSITION LIGHT-INTEGRATED BLINKER APPARATUS

TECHNICAL FIELD

The present invention relates to a position light-integrated blinker apparatus for a saddle riding vehicle offering improved visibility.

BACKGROUND ART

Patent Document 1 discloses a position light-integrated blinker apparatus of the known art that integrates a position light with a blinker light.

CITATION LIST

Patent Literature

Patent Literature 1: JP-A No. 2008-087755

SUMMARY OF THE INVENTION

Problem to be Solved by the Invention

The position light-integrated blinker apparatus of the known art, however, forms a light-emitting region by the position light with a bulb type point light source. Thus, when an LED (light-emitting diode), for example, is to be used as the light source, a need exists for making a light-emitting area look bigger because of high directivity involved of the LED. Specifically, the position light-integrated blinker apparatus of the known art needs further improvement on visibility.

In view of the problem associated with the known art, an object of the present invention is to provide a position light-integrated blinker apparatus for a saddle riding vehicle offering improved visibility.

Means for Solving Problems

To achieve the above object, the present invention has a first feature in that a position light-integrated blinker apparatus (7) for a saddle riding vehicle, comprises: a blinker-light light source (90); position-light light sources (91, 92); and a housing (40) housing both the blinker-light light source (90) and the position-light light sources (91, 92), wherein a position light light-emitting region (87) formed by illumination of the position-light light sources (91, 92) surrounds a blinker light light-emitting region (86) formed by illumination of the blinker-light light source (90).

The present invention has a second feature that the position light-integrated blinker apparatus further comprises: a light guide member (70) facing the position-light light sources (91, 92) and having an annular shape in a front view, wherein the light guide member (70) is irradiated with light from the position-light light sources (91, 92) to thereby form the position light light-emitting region (87).

The present invention has a third feature that the blinker-light light source (90) is disposed at a center of a circle formed by the light guide member (70).

The present invention has a fourth feature that the position-light light sources (91, 92) includes a first light source (91) and a second light source (92), and the first light source (91) and the second light source (92) are each disposed on both ends of a diameter of the circle formed by the light guide member (70).

The present invention has a fifth feature that the first light source (91), the second light source (92), and the blinker-light light source (90) are disposed linearly side by side so as to extend in parallel with an arm (28) that supports the position light-integrated blinker apparatus (7) on a vehicle body.

The present invention has a sixth feature that the position-light light sources (91, 92) and the blinker-light light source (90) are disposed on a shared substrate (60).

The present invention has a seventh feature that the position light-integrated blinker apparatus according to any one of claims 1 to 6, further comprises: an outer lens (80) that includes a position light transmission portion (82) irradiated with light from the position-light light sources (91, 92) and a blinker light lens portion (81) irradiated with light from the blinker-light light source (90), wherein the blinker light lens portion (81), being formed at a position closer to a light source in an irradiation direction than the position light transmission portion (82) is, results in a concave portion (83) being formed by the blinker light lens portion (81) on a side of a front surface of the outer lens (80).

The present invention has an eighth feature that the light guide member (70) includes a light introduction portion (74), a circumferential bottom portion (73), and a substantially torus-shaped portion (71), the light introduction portion (74) is disposed to face the respective position-light light sources (91, 92) and so as to receive light from the respective position-light light sources (91, 92) incident upon the light introduction portion (74), the circumferential bottom portion (73) is configured so as to reflect the incident light toward an anterior side in the vehicle, and the substantially torus-shaped portion (71) is configured so as to emit the reflected light toward the anterior side in the vehicle of the light guide member (70).

The present invention has a ninth feature that the substantially torus-shaped portion (71) has a reflection concave portion (75) formed at a position facing the light introduction portion (74), and the light incident upon the light introduction portion (74) is reflected by the reflection concave portion (75) and directed toward the circumferential bottom portion (73).

The present invention has a tenth feature that the light guide member (70) includes the light introduction portion (74), the light introduction portion (74) is disposed to face the respective position-light light sources (91, 92) and so as to receive light from the respective position-light light sources (91, 92) incident upon the light introduction portion (74), the light guide member (70) is formed, in a portion that guides the light from the position-light light sources (91, 92), to be symmetric about a plane, and, to introduce the light from the position-light light sources (91, 92) incident upon the light introduction portion (74) to each of a first side and a second side of the plane-symmetric shape, the light introduction portions (74) each have light introduction surfaces (741, 742) that are each inclined toward the first side or the second side.

Effects of the Invention

According to the first feature in that a position light-integrated blinker apparatus (7) for a saddle riding vehicle, comprises: a blinker-light light source (90); position-light light sources (91, 92); and a housing (40) housing both the blinker-light light source (90) and the position-light light sources (91, 92), wherein a position light light-emitting region (87) formed by illumination of the position-light light sources (91, 92) surrounds a blinker light light-emitting region (86) formed by illumination of the blinker-light light source (90), an expanse and a pattern achieved by the surrounding enhance visibility of the position light light-emitting region (87).

According to the second feature that the position light-integrated blinker apparatus further comprises: a light guide member (70) facing the position-light light sources (91, 92) and having an annular shape in a front view, wherein the light guide member (70) is irradiated with light from the position-light light sources (91, 92) to thereby form the position light light-emitting region (87), the light guide member (70) having the annular ring shape emits light to thereby form the position light light-emitting region (87) in an annular ring shape, which enhances visibility of the position light light-emitting region (87).

According to the third feature that the blinker-light light source (90) is disposed at a center of a circle formed by the light guide member (70), even when the region to be used for disposing the light sources has a small area, this small area can be effectively utilized for disposing the light sources.

According to the fourth feature that the position-light light sources (91, 92) includes a first light source (91) and a second light source (92), and the first light source (91) and the second light source (92) are each disposed on both ends of a diameter of the circle formed by the light guide member (70), even when the region to be used for disposing the light sources has a small area, this small area can be effectively utilized for disposing the light sources.

According to the fifth feature that the first light source (91), the second light source (92), and the blinker-light light source (90) are disposed linearly side by side so as to extend in parallel with an arm (28) that supports the position light-integrated blinker apparatus (7) on a vehicle body, routing performance for the harness with which power is supplied to each light source can be enhanced.

According to the sixth feature that the position-light light sources (91, 92) and the blinker-light light source (90) are disposed on a shared substrate (60), the number of parts used can be reduced.

According to the seventh feature that the position light-integrated blinker apparatus according to any one of the first to sixth features, further comprises: an outer lens (80) that includes a position light transmission portion (82) irradiated with light from the position-light light sources (91, 92) and a blinker light lens portion (81) irradiated with light from the blinker-light light source (90), wherein the blinker light lens portion (81), being formed at a position closer to a light source in an irradiation direction than the position light transmission portion (82) is, results in a concave portion (83) being formed by the blinker light lens portion (81) on a side of a front surface of the outer lens (80), the position light light-emitting region (87) and the blinker light light-emitting region (86) can be formed with a clear distinction between the position light light-emitting region (87) and the blinker light light-emitting region (86).

According the eighth feature that the light guide member (70) includes a light introduction portion (74), a circumferential bottom portion (73), and a substantially torus-shaped portion (71), the light introduction portion (74) is disposed to face the respective position-light light sources (91, 92) and so as to receive light from the respective position-light light sources (91, 92) incident upon the light introduction portion (74), the circumferential bottom portion (73) is configured so as to reflect the incident light toward an anterior side in the vehicle, and the substantially torus-shaped portion (71) is configured so as to emit the reflected light toward the anterior side in the vehicle of the light guide member (70), the light from the position-light light sources (91, 92) can be emitted to the anterior side in the vehicle through the light guide member (70).

According to the ninth feature that the substantially torus-shaped portion (71) has a reflection concave portion (75) formed at a position facing the light introduction portion (74), and the light incident upon the light introduction portion (74) is reflected by the reflection concave portion (75) and directed toward the circumferential bottom portion (73), the light from the position-light light sources (91, 92) can be emitted to the anterior side in the vehicle through the light guide member (70).

According to the tenth feature that the light guide member (70) includes the light introduction portion (74), the light introduction portion (74) is disposed to face the respective position-light light sources (91, 92) and so as to receive light from the respective position-light light sources (91, 92) incident upon the light introduction portion (74), the light guide member (70) is formed, in a portion that guides the light from the position-light light sources (91, 92), to be symmetric about a plane, and, to introduce the light from the position-light light sources (91, 92) incident upon the light introduction portion (74) to each of a first side and a second side of the plane-symmetric shape, the light introduction portions (74) each have light introduction surfaces (741, 742) that are each inclined toward the first side or the second side, the light guide member (70) can emit light favorably through efficient and uniform introduction of light from the position-light light sources (91, 92) to each of the first side and the second side of the plane-symmetric shape of the light guide member (70).

MODE FOR CARRYING OUT THE INVENTION

Figure 1:
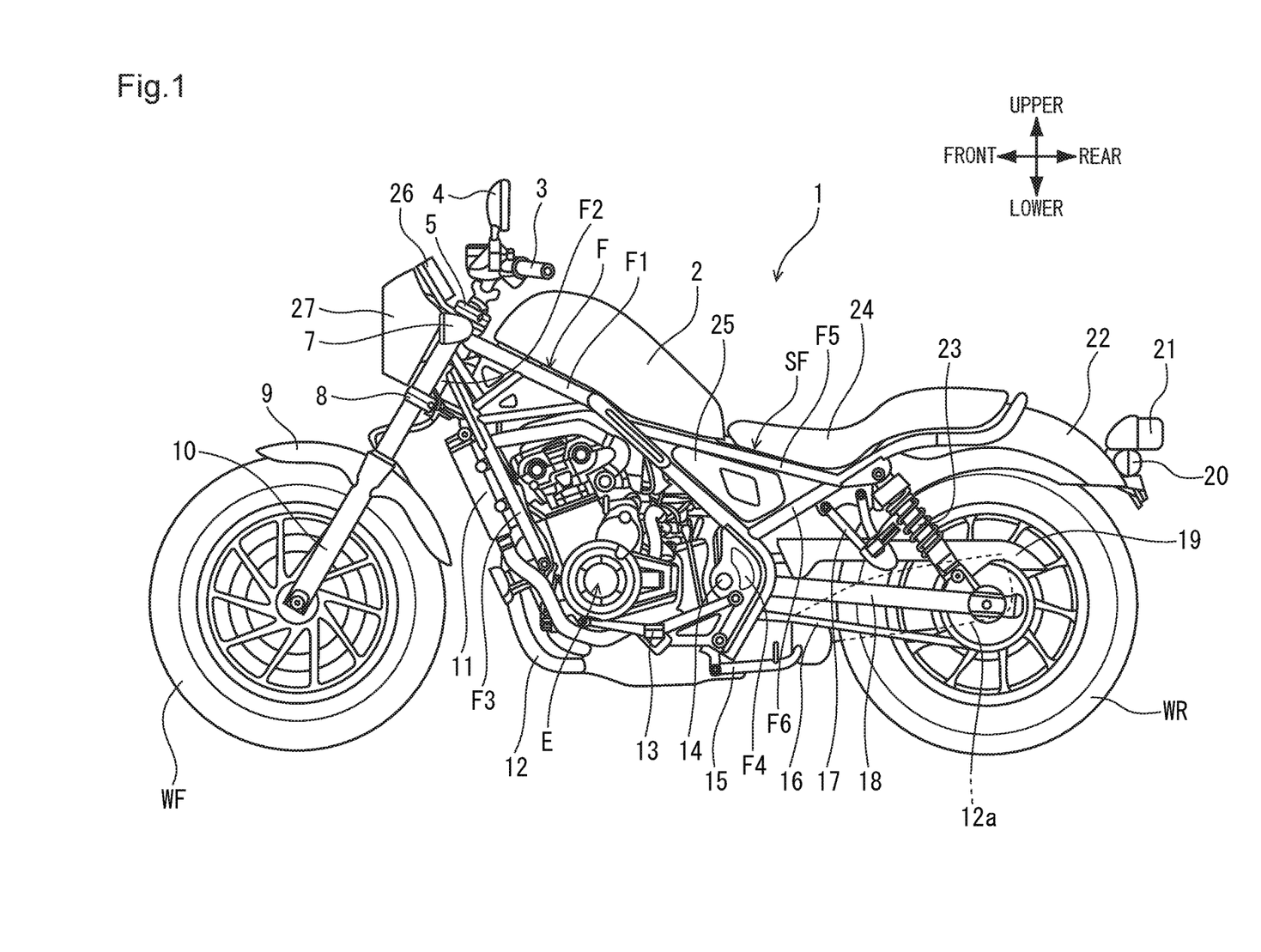
FIG. 1 is a left side elevation view of a motorcycle, to which a position light-integrated blinker apparatus according to an embodiment of the present invention is applied.
Figure 2:
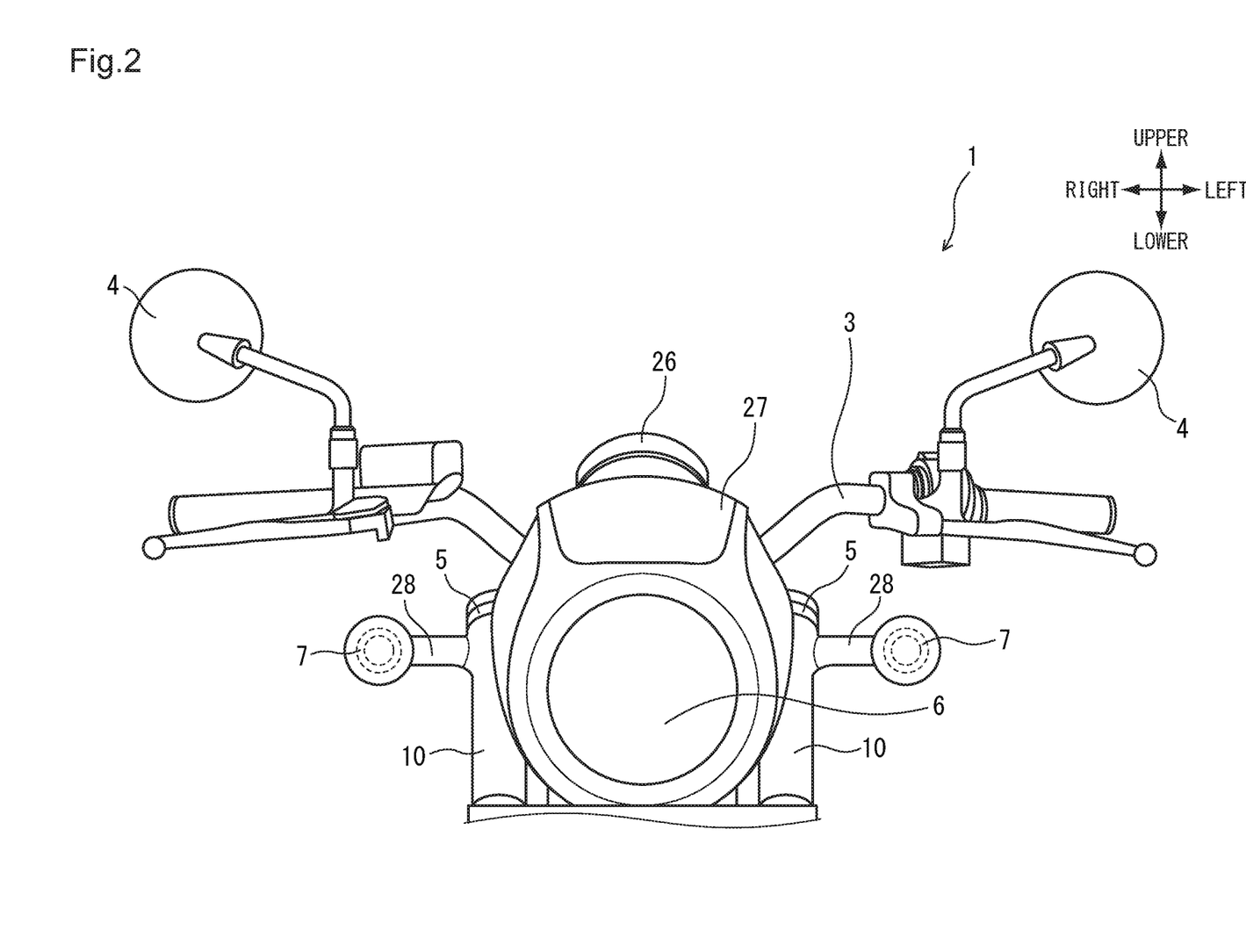
FIG. 2 is a front elevation view of the motorcycle.

FIG. 1 is a left side elevation view of a motorcycle 1, to which a position light-integrated blinker apparatus according to an embodiment of the present invention is applied. FIG. 2 is a front elevation view of the motorcycle 1. A vehicle body frame F of the motorcycle 1 includes a pair of left and right main frames F1, a pair of left and right hanger frames F3, and a pair of left and right pivot frames F4. The main frames F1 extend from a head pipe F2 downwardly toward a rear in a vehicle body. The hanger frames F3 extend from the head pipe F2 downwardly toward the rear in the vehicle body along a path inferior to the main frames F1. The pivot frames F4 are connected with rear lower portions of the main frames F1. A seat frame SF is connected with rear portions of the main frames F1. The seat frame SF includes a pair of left and right upper pipes F5 and lower pipes F6 and extends upwardly toward the rear.

An engine E is supported between the main frames F1 and the hanger frames F3. A radiator 11 is disposed at a front portion of the hanger frames F3. Combustion gas from the engine E is discharged from a muffler 12a, which is disposed on the right in a vehicle width direction, via an exhaust pipe 12.

The pivot frames F4 support a pivot 14. The pivot 14 journals oscillatably a front end portion of a swing arm 18. A drive force of the engine E is transmitted to a rear wheel WR via a drive chain 16. The rear wheel WR is rotatably journaled by a rear end portion of the swing arm 18. A chain cover 19 is mounted above the swing arm 18. The chain cover 19 covers the drive chain 16 from above. The swing arm 18 has a rear portion suspended on the seat frame SF by a pair of left and right rear cushions 23. A pair of left and right tandem step holders 17 is mounted on the lower pipes F6. The lower pipes F6 are disposed anterior to the rear cushions 23.

A pair of left and right front forks 10 journals a front wheel WF rotatably. The front forks 10 are supported by a top bridge 5 and a bottom bridge 8 at upper and lower positions of the head pipe F2. A stem shaft (not illustrated) that vertically connects the top bridge 5 and the bottom bridge 8 is journaled rotatably with respect to the head pipe F2. A steering handlebar 3, which extends in the vehicle width direction, is fixed to an upper portion of the top bridge 5. Rearview mirrors 4 are mounted on the steering handlebar 3. A meter apparatus 26 is supported by the top bridge 5. A headlight 6, on which a front cowl 27 is mounted, is supported by the bottom bridge 8. A pair of left and right blinker apparatuses 7 (position light-integrated blinker apparatuses 7) on a front side is supported by arms 28 (see FIG. 2). The arms 28 extend from the front forks 10 to the outside in the vehicle width direction at lower positions of the top bridge 5.

A fuel tank 2 is supported on upper portions of the main frames F1. A seat 24 is disposed in the rear of the fuel tank 2. A side cover 25 is disposed at a position inferior to the seat 24 and surrounded by the main frames F1, the upper pipes F5, and the lower pipes F6. A taillight apparatus 21 and a pair of left and right rear blinker apparatuses 20 are mounted on a rear fender 22. The rear fender 22 is disposed in the rear of the seat 24.

Figure 3:
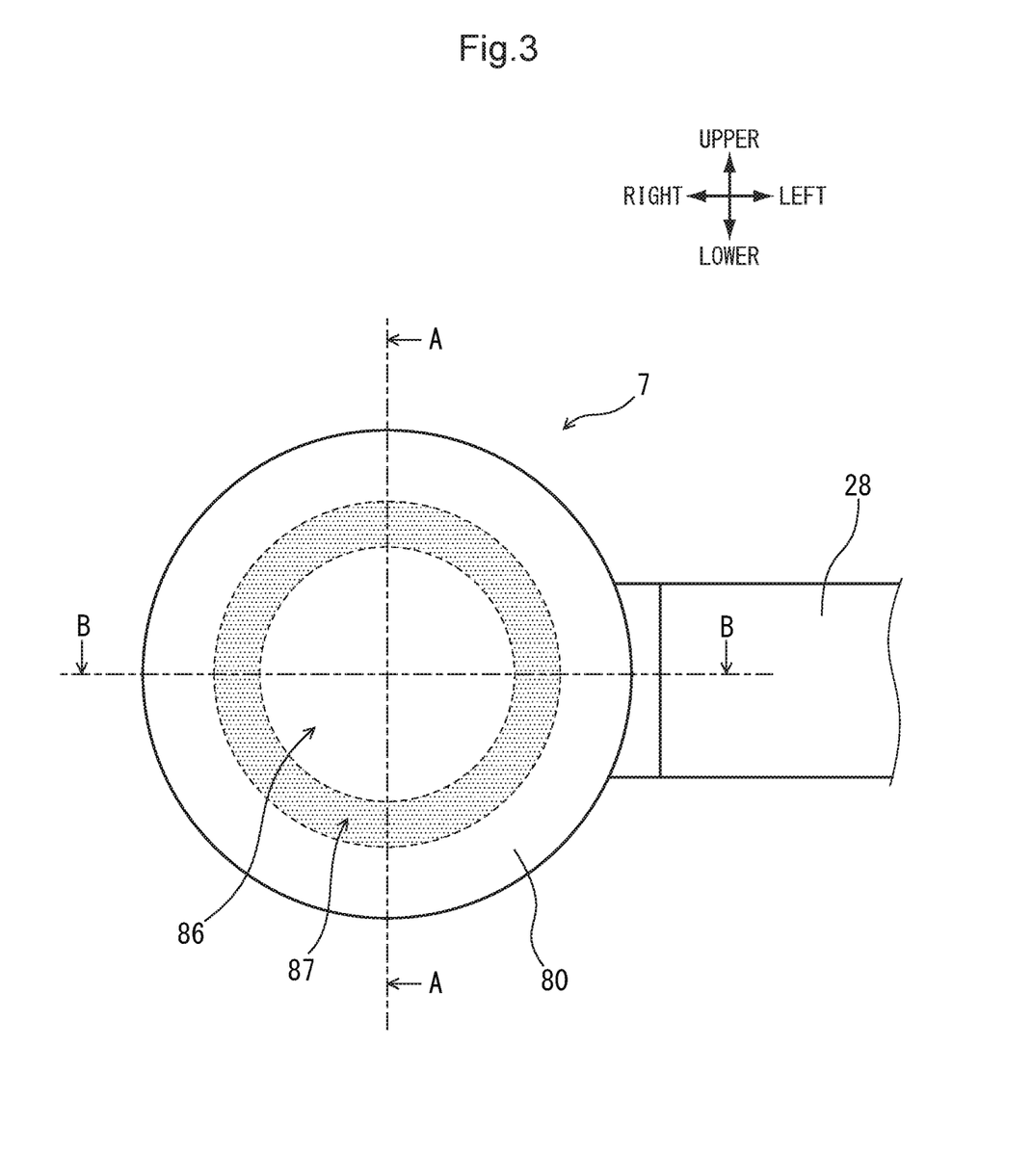
FIG. 3 is a front elevation view of a position light-integrated blinker apparatus on the right-hand side of the pair of left and right position light-integrated blinker apparatuses on the front side in the embodiment.

FIG. 3 is a front elevation view of a position light-integrated blinker apparatus 7 on the right-hand side of the pair of left and right position light-integrated blinker apparatuses 7 on the front side in the embodiment. The position light-integrated blinker apparatuses 7 are bilaterally symmetric and the following describes the position light-integrated blinker apparatus 7 on the right-hand side.

The position light-integrated blinker apparatus 7 includes an outer lens 80. The outer lens 80 has a substantially circular shape in a front view. A blinker light light-emitting region 86 is formed as a circular region on a central side with respect to the circular shape. A position light light-emitting region 87 is formed as an annular region surrounding the blinker light light-emitting region 86. In the position light-integrated blinker apparatus 7 in the embodiment, the position light light-emitting region 87 is formed so as to surround the blinker light light-emitting region 86, unlike the blinker light light-emitting region formed like dots as in the known art. The position light-integrated blinker apparatus 7 can thereby achieve a predetermined area and a predetermined pattern shape, to thereby enhance visibility of the position light light-emitting region 87.

Figure 4:
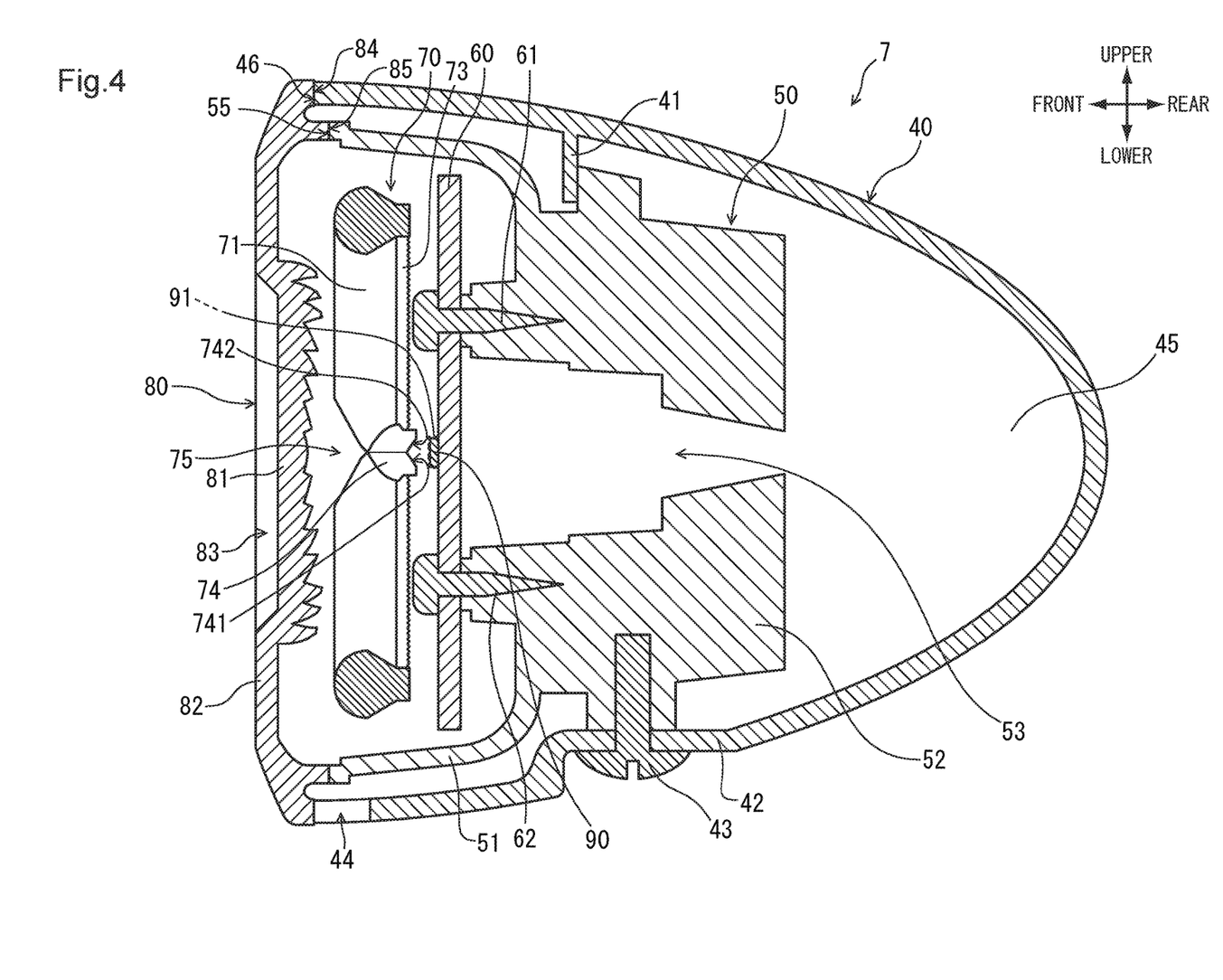
FIG. 4 is a cross-sectional view taken along A-A in FIG. 3.
Figure 5:
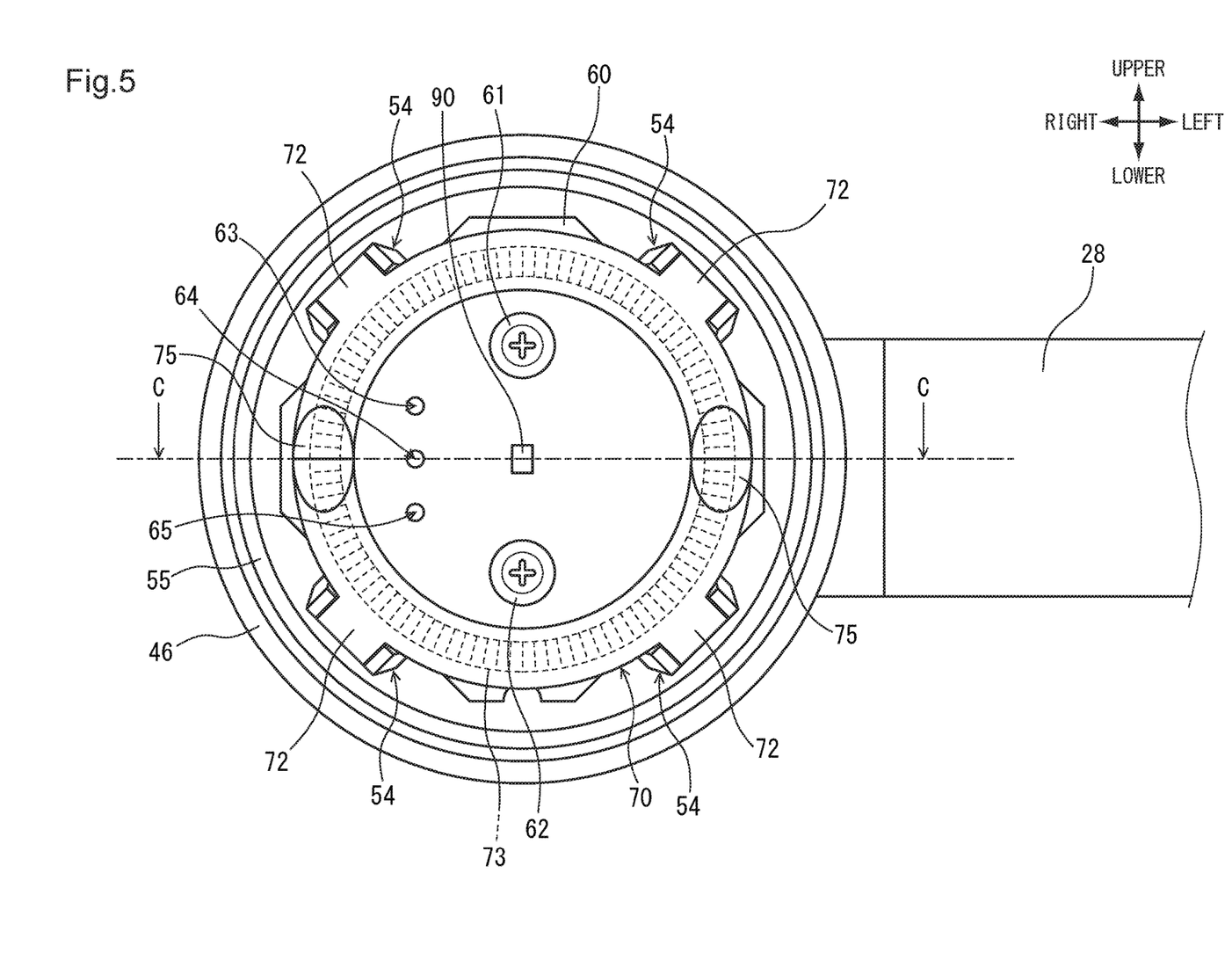
FIG. 5 illustrates a condition in which the outer lens has been removed from the position light-integrated blinker apparatus illustrated in the front elevation view of FIG. 3.
Figure 6:
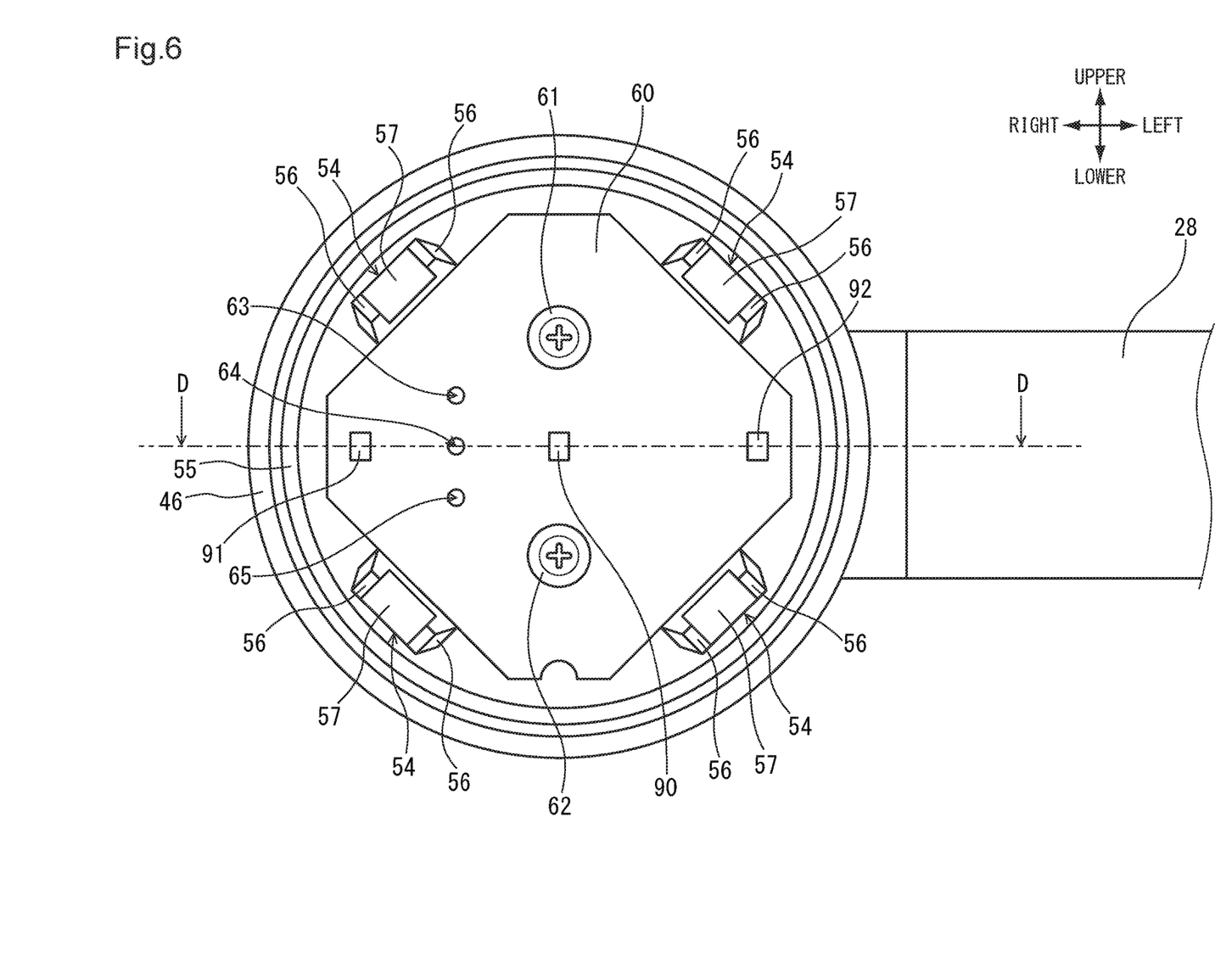
FIG. 6 illustrates a condition in which the light guide member has additionally been removed from the condition illustrated in FIG. 5.

FIG. 4 is a cross-sectional view taken along A-A in FIG. 3. The position light-integrated blinker apparatus 7 includes, as major structural members of the position light-integrated blinker apparatus 7, a semi-ellipsoidal housing 40, an internal unit 50, a substrate 60, a light guide member 70, and the outer lens 80. FIG. 5 illustrates a condition in which the outer lens 80 has been removed from the position light-integrated blinker apparatus 7 illustrated in the front elevation view of FIG. 3. FIG. 6 illustrates a condition in which the light guide member 70 has additionally been removed from the condition illustrated in FIG. 5.

Figure 7:
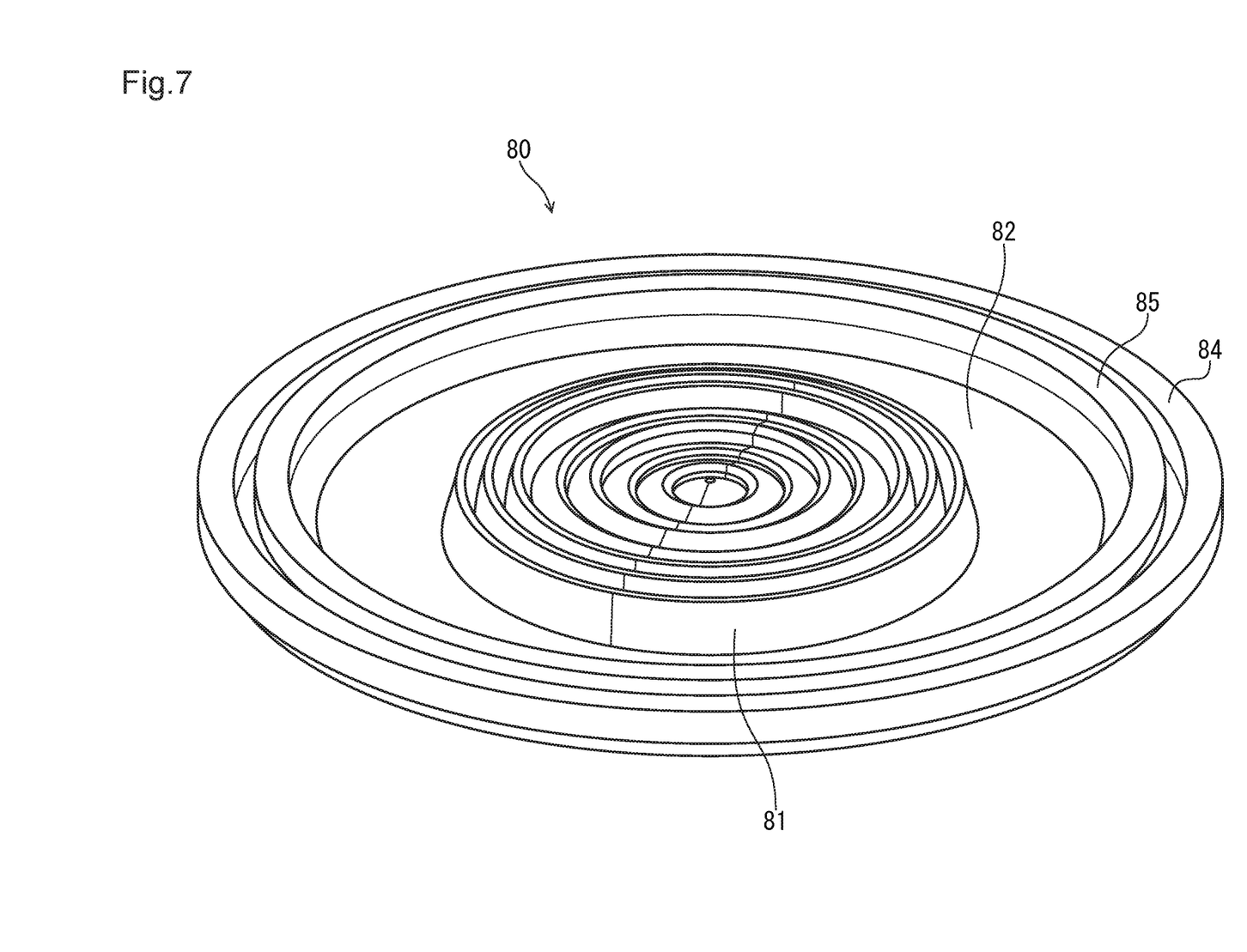
FIG. 7 is a perspective view of the outer lens.
Figure 8:
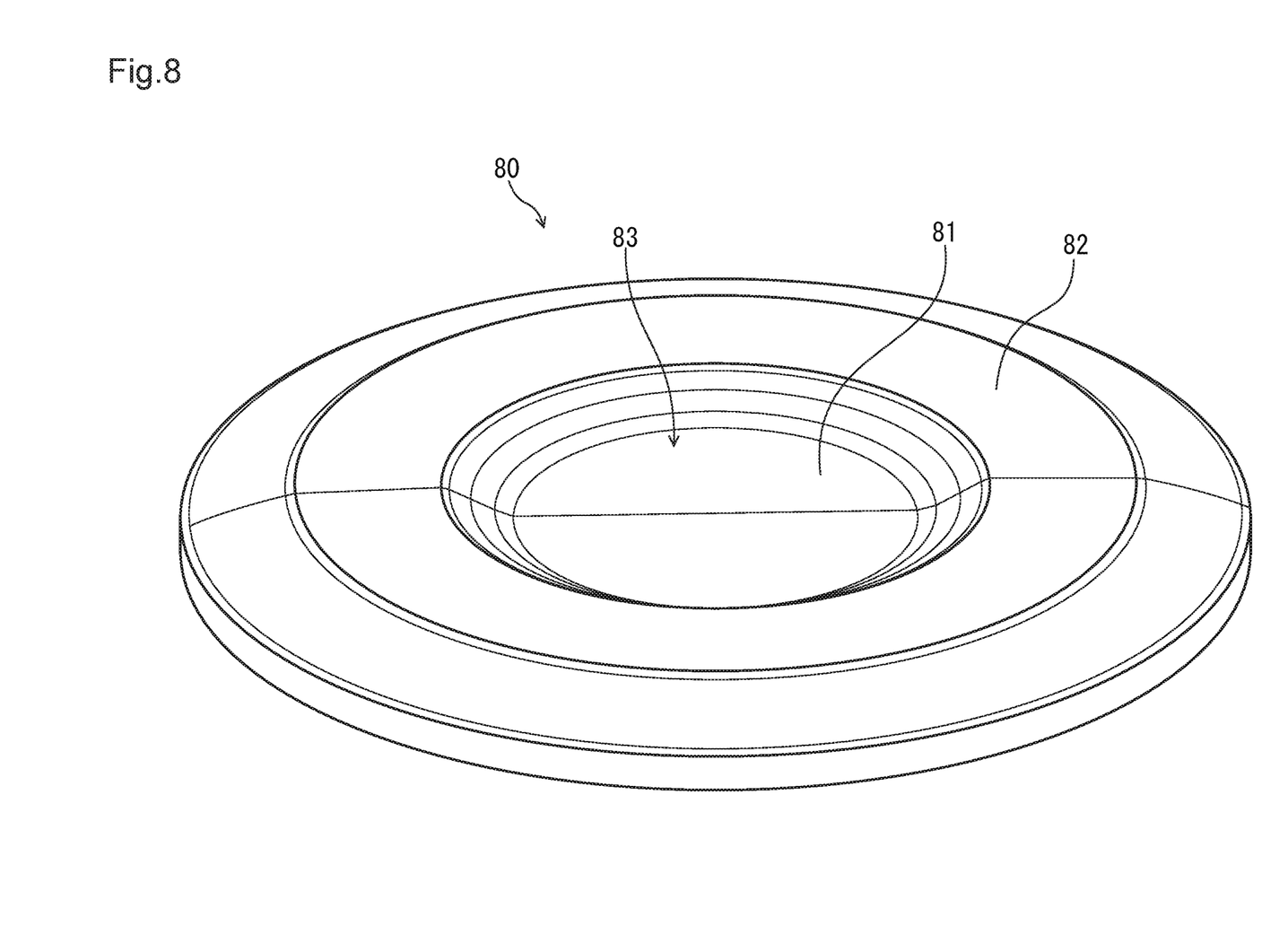
FIG. 8 is a perspective view of the outer lens.

FIGS. 7 and 8 are each a perspective view of the outer lens 80. FIG. 7 is a perspective view of the outer lens 80 as viewed from an inside of the position light-integrated blinker apparatus 7 (the side on which a light source exists) for mounting the outer lens 80 on the position light-integrated blinker apparatus 7. FIG. 8 is a perspective view of the outer lens 80 as viewed from an outside of the position light-integrated blinker apparatus 7.

Figure 9:
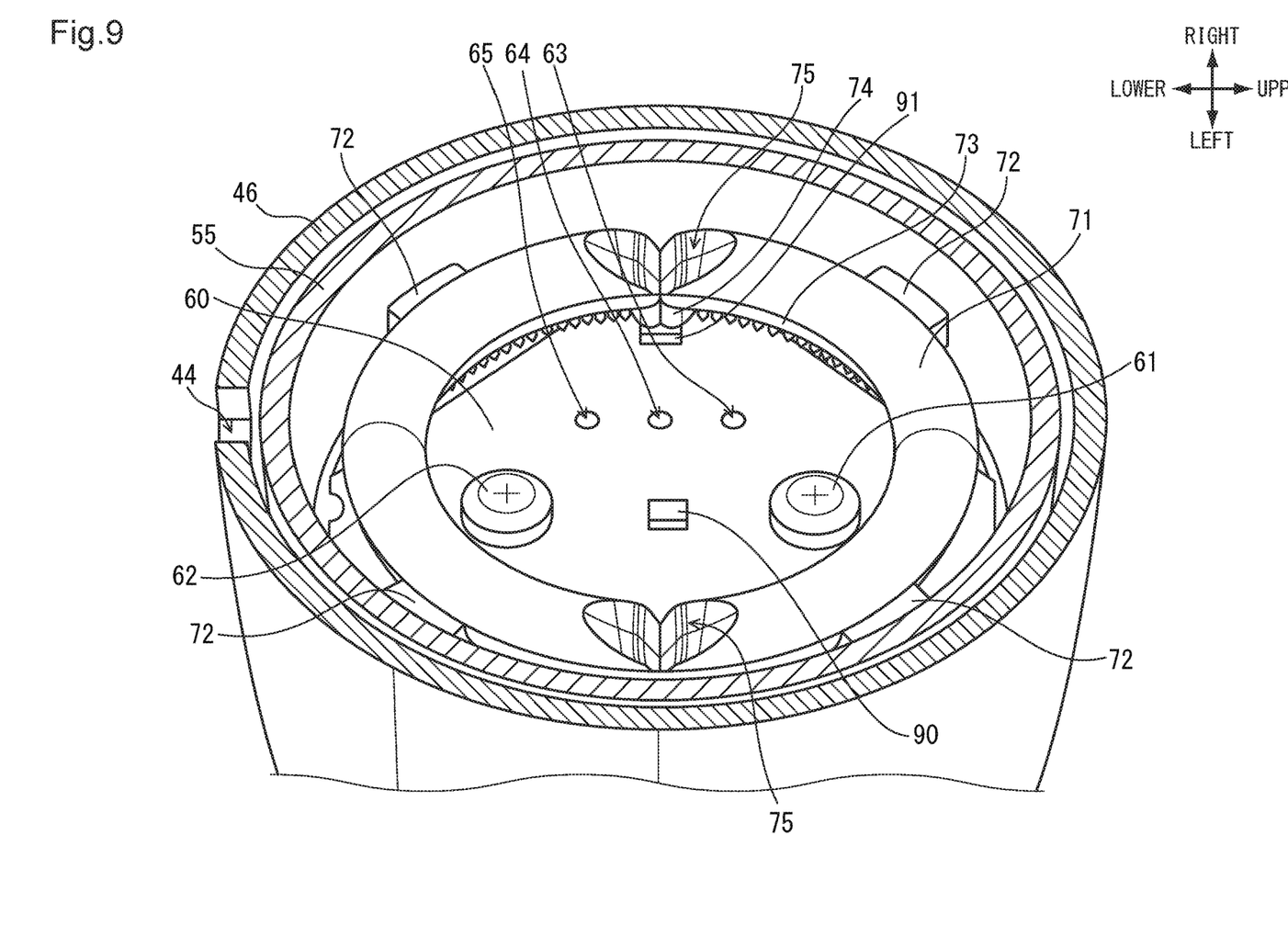
FIG. 9 is a perspective view of the position light-integrated blinker apparatus from which the outer lens has been removed as illustrated in FIG. 5.
Figure 10:
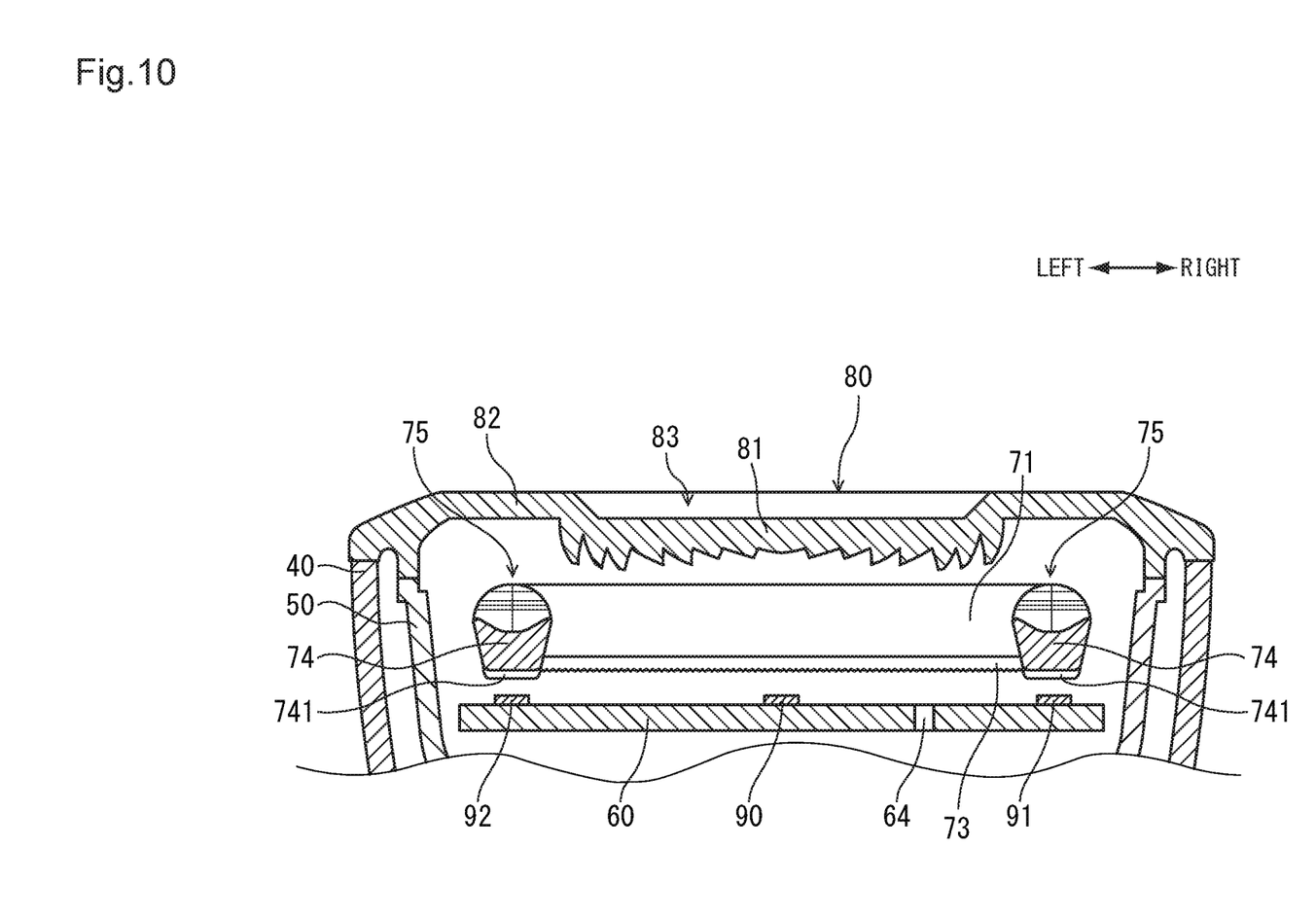
FIG. 10 is a cross-sectional view taken along B-B in FIG. 3.

FIG. 9 is a perspective view of the position light-integrated blinker apparatus 7 from which the outer lens 80 has been removed as illustrated in FIG. 5. FIG. 10 is a cross-sectional view taken along B-B in FIG. 3. It is noted that the cross section taken along B-B in FIG. 3 corresponds to a cross section taken along C-C in FIG. 5 and to a cross section taken along D-D in FIG. 6.

The position light-integrated blinker apparatus 7 in the embodiment will be described below with reference to mainly FIG. 4 and to FIGS. 5 to 10 as necessary.

Reference is made to FIG. 4. The internal unit 50 is fixed to the semi-ellipsoidal housing 40, which is formed of, for example, a resin. Specifically, the internal unit 50 is first positioned by a protruding wall portion 41, which is formed on a superior inner wall of the housing 40, and is fastened to the housing 40 with a screw 43, which is inserted in a threaded hole in an inferior flat portion 42 of the housing 40. The housing 40 has a water drain hole 44 formed in a lowermost portion at a front of the housing 40.

The internal unit 50 is formed of, for example, a resin to integrate, as major structural members of the internal unit 50, an inner wall portion 51 and a guide portion 52. The inner wall portion 51 defines an internal space having a substantially cylindrical shape, within which light sources (one blinker-light light source 90 and two position-light light sources 91 and 92), the light guide member 70, and other parts of the position light-integrated blinker apparatus 7 are disposed. The guide portion 52 guides wiring (not illustrated) for lighting up these light sources. The guide portion 52 defines an internal cavity 53 inside the guide portion 52. The guide portion 52 guides the wiring through the internal cavity 53 from the light sources on the substrate 60 to a posterior space 45, which is formed on a rear side in the vehicle body between the guide portion 52 and the housing 40, and then guides the wiring further toward a vehicle side of the motorcycle 1 via the arm 28. The guide portion 52 further has a function of fixing the internal unit 50 with respect to the housing 40 as described previously and a function of fixing the substrate 60, which will be described below.

The substrate 60 is fastened by a pair of tapping screws 61 and 62 to thereby be fixed to the guide portion 52 of the internal unit 50. Reference is made to FIGS. 5 and 6. The substrate 60 is formed substantially into a square with four corners cut. The substrate 60 is to substantially shield, in a front view, a circle formed in the inner wall portion 51 of the internal unit 50. The one blinker-light light source 90 is disposed at the center of the substrate 60 and the two position-light light sources 91 and 92 are disposed on a diagonal line of the substantially square substrate 60. The blinker-light light source 90 and the position-light light sources 91 and 92 may each incorporate an LED element. The substrate 60 has three wiring holes 63, 64, and 65 formed in the substrate 60. The foregoing configuration enables the wiring to be guided from the internal cavity 53 in the guide portion 52 of the internal unit 50 to the blinker-light light source 90 and the position-light light sources 91 and 92 as described previously.

As such, as illustrated, for example, in FIG. 6, the blinker-light light source 90 and the position-light light sources 91 and 92 are disposed linearly side by side so as to extend in parallel with the arm 28 of the position light-integrated blinker apparatus 7, so that wire routing performance of the blinker-light light source 90 and the position-light light sources 91 and 92 can be enhanced.

It is here noted that the two position-light light sources 91 and 92 are each disposed at positions on both ends of a diameter of a circle formed by the light guide member 70 and at diagonally opposed positions in the substantially square formed by the substrate 60. The two position-light light sources 91 and 92, being disposed at the positions on both ends of the diameter of the circle formed by the light guide member 70, enable an entire region of the light guide member 70 to be illuminated efficiently with only the two light sources.

The blinker-light light source 90 is disposed at the center of the circle formed by the light guide member 70 and a center of the diagonal line in the substantially square formed by the substrate 60. This configuration enables a limited area of the substrate 60 inside the position light-integrated blinker apparatus 7 to be utilized for disposing the two position-light light sources 91 and 92 and the one blinker-light light source 90 on the substrate 60.

The disposition of the blinker-light light source 90 and the position-light light sources 91 and 92 on the single substrate 60 enables reduction in the number of parts used.

The light guide member 70 includes, as major elements thereof forming a shape thereof, a substantially torus-shaped portion 71 having a reflection concave portion 75, four leg portions 72, a circumferential bottom portion 73, and two light introduction portions 74. The light guide member 70 is, for example, an acrylic or polycarbonate colorless or colored transparent part integrating the foregoing elements.

In the light guide member 70, the four fixing leg portions 72 are protruded with respect to the substantially torus-shaped portion 71 in radial directions as viewed from the center of the circle. The light guide member 70 is fixed with respect to the inner wall portion 51 of the internal unit 50 by each of the four leg portions 72 being fixed by, for example, bonding or fusion to a corresponding one of shelf portions 54, which protrude from the inner wall portion 51 of the internal unit 50 at positions facing respective four sides of the substantially square substrate 60 as illustrated in FIG. 5. As illustrated in FIG. 6 that illustrates a condition in which the light guide member 70 has been removed, each of the four shelf portions 54 includes two wall portions 56 and 56, which extend in parallel with each other, and a bottom portion 57, which extends perpendicularly to the two wall portions 56 and 56. The shelf portions 54 each protrude from the inner wall portion 51. The leg portions 72 engage with the respective shelf portions 54, so that the leg portions 72 can be fixed to the respective shelf portions 54.

The light guide member 70 is fixed with respect to the inner wall portion 51 of the internal unit 50, and the substrate 60 is fixed to the guide portion 52 of the internal unit 50. The light guide member 70 thereby faces the substrate 60 at a position close to the substrate 60. The disposition of the light guide member 70 causes, as illustrated in FIGS. 4, 9, and 10, the two position-light light sources 91 and 92, which are disposed on the substrate 60, to face the two respective light introduction portions 74 of the light guide member 70 at positions close to the two respective light introduction portions 74.

The light guide member 70 is shaped to have the circumferential bottom portion 73 and the two light introduction portions 74, in addition to the four leg portions 72, which protrude from the substantially torus-shaped portion 71. The circumferential bottom portion 73 is connected with the torus-shaped portion 71 and protrudes toward the side of the substrate 60. The circumferential bottom portion 73 faces the substrate 60 and has a circumferential groove structure for reflection. The two light introduction portions 74 are connected with the substantially torus-shaped portion 71, are close to face the position-light light sources 91 and 92, respectively, and protrude from the substantially torus-shaped portion 71. The two light introduction portions 74 thereby have a function of introducing light from the position-light light sources 91 and 92 into the light guide member 70. The circumferential bottom portion 73 ends and not formed at portions at which the light introduction portions 74 are disposed in the circumference.

As illustrated in FIG. 4, for example, the torus-shaped portion 71 has a cross section that is, at positions other than positions close to the two light introduction portions 74, substantially semi-circular on the side facing the outer lens 80 (the anterior side in the vehicle in FIG. 4) and that is shaped to be a linear taper having a width narrowing to match up a width of the circumferential bottom portion 73 on an opposite side connected with the circumferential bottom portion 73 (the rear side in the vehicle in FIG. 4). Specifically, the circumferential bottom portion 73 has a width smaller than a diameter of the substantially semicircle formed by the cross section on the side of the outer lens 80, so that the cross section of the torus-shaped portion 71 on the side connected with the circumferential bottom portion 73 has a linear taper shape.

Additionally, the substantially torus-shaped portion 71 is shaped to have the reflection concave portions 75 at positions at which the torus-shaped portion 71 faces the two respective light introduction portions 74.

Light from each of the position-light light sources 91 and 92 is incident upon the corresponding one of two light introduction portions 74, which face the respective position-light light sources 91 and 92. The light is then partially reflected by a surface formed by the corresponding one of the reflection concave portions 75 and is directed to the reflection groove formed in the circumferential bottom portion 73. The light is further reflected by the reflection groove toward the anterior side of the vehicle and is emitted from the semi-circular surface on the anterior side in the vehicle of the substantially torus-shaped portion 71 toward the anterior side in the vehicle. Thereby, an entire region on the front side of the light guide member 70 forms a light-emitting region having an annular ring shape (an annular ring shape excepting the four leg portions 72) in a front view of the vehicle. The light-emitting region, when being viewed from an outside of the position light-integrated blinker apparatus 7 through the position light transmission portion 82, forms the blinker light light-emitting region 86.

The light guide member 70 is formed such that a uniform light-emitting region is efficiently formed throughout the entire region of the annular ring shape.

Specifically, the light guide member 70 is symmetric about a plane (the cross section in FIG. 10) that passes through the reflection concave portions 75 and the light introduction portions 74. The light introduction portions 74 each have a pair of inclined light introduction surfaces 741 and 742, which are symmetric with each other (FIGS. 4 and 10), in order for the light from the position-light light sources 91 and 92 to be uniformly separated and to enter so that the respective semi-circular ring portions can illuminate uniformly. An orientation of the inclined light introduction surfaces 741 and 742 (the orientation of the inclined surface defined by a line normal to the surface) is set such that the inclined light introduction surfaces 741 and 742 are each inclined so as to face the semi-circular ring portion to which the corresponding one of the light introduction surfaces 741 and 742 belongs with respect to a front surface of the position-light light source 91 or 92 (anterior direction of the vehicle). This configuration ensures that the light is efficiently incident upon a position away from the position-light light sources 91 and 92 with respect to the corresponding semi-circular ring portion.

The configuration in which the light guide member 70 is symmetric about the plane may be applicable only to a portion relating to the function of guiding the light from the position-light light sources 91 and 92. Assume, for example, that one of the four leg portions 72, which have the positioning function, but not the light guide function, is omitted. In this case, the light guide member 70 is generally no longer symmetric about a plane. Portions not directly relating to the light guide function may not necessarily have to be symmetric about a plane. Additionally, the configuration of being symmetric about a plane may be evaluated within a predetermined accuracy range.

The outer lens 80 is densely and integrally formed of, for example, acrylic or polycarbonate into a colorless or colored transparent part. As illustrated in FIGS. 4 and 10 including the cross-sectional views and in FIGS. 7 and 8 as the perspective views, the outer lens 80 includes a blinker light lens portion 81 on a central side and the position light transmission portion 82, which annularly surrounds the blinker light lens portion 81. The outer lens 80 is rotationally symmetric about a central axis.

The outer lens 80 includes two edge portions, specifically, an outer lens outer edge portion 84 and an outer lens inner edge portion 85, disposed on the outer circumferential side of the outer lens 80. The outer lens outer edge portion 84 is fixed by, for example, bonding or fusion to a housing edge portion 46 of the housing 40, which results in the outer lens 80 being fixed with respect to the housing 40. Furthermore, the outer lens inner edge portion 85 is fixed by, for example, bonding or fusion to an internal unit edge portion 55 of the inner wall portion 51 of the internal unit 50, which results in the outer lens 80 being fixed with respect to the internal unit 50.

The circular blinker light light-emitting region 86 and the annular position light light-emitting region 87 when the position light-integrated blinker apparatus 7 is viewed in a front view (FIG. 3) are formed by illumination of the one blinker-light light source 90 via the blinker light lens portion 81 and illumination of the two position-light light sources 91 and 92 via the light guide member 70 and the position light transmission portion 82, respectively.

Reference is made to FIGS. 4 and 10. The blinker light lens portion 81 is formed at a position (the position closer to the light source in the irradiation direction) in a direction opposite from an irradiation direction of the light source (anterior side of the vehicle) so as to be closer to the side of the substrate 60 (rear side in the vehicle in FIG. 4) than the position light transmission portion 82 is. This configuration results in a concave portion 83 being formed in the central side of the outer lens 80. The blinker light lens portion 81 is thereby disposed closer to the blinker-light light source 90 and, additionally, is subjected to lens cut so as to direct the light from the blinker-light light source 90 toward the front of the vehicle. The following function can thereby be achieved. The function is, specifically, to make the light (e.g., light having directivity from an LED) from the blinker-light light source 90 travel along a path toward only the blinker light lens portion 81, which is disposed closer to and further inside a circle (circle with the blinker-light light source 90 at the center), and to prevent the light from traveling toward the position light transmission portion 82, which is disposed further outside the circle.

The disposition of the blinker light lens portion 81 at the position closer to the blinker-light light source 90 through the formation of the concave portion 83 as described above results in the blinker light lens portion 81 being also disposed at a position closer to the light guide member 70. The lens cut surface of the blinker light lens portion 81 also has a shielding function such that an effect of illumination from the light guide member 70 does not appear within the blinker light light-emitting region 86.

The formation of the blinker light lens portion 81 at a position further inside relative to the position light transmission portion 82 through the formation of the concave portion 83 as described above enables the circular blinker light light-emitting region 86 and the annular position light light-emitting region 87, which is disposed so as to surround the blinker light light-emitting region 86 (FIG. 3), to be formed such that a boundary between the circular blinker light light-emitting region 86 and the annular position light light-emitting region 87 is clearly identified.

Thus, the one blinker-light light source 90 and the two position-light light sources 91 and 92, which are small in number, can form the blinker light light-emitting region 86 and the position light light-emitting region 87 through a clear distinction between the blinker light light-emitting region 86 and the position light light-emitting region 87. Moreover, the utilization of the light guide member 70 and the outer lens 80 as described above for the formation of the blinker light light-emitting region 86 and the position light light-emitting region 87 eliminates the need for a structure such as for partitioning light-emitting regions inside the position light-integrated blinker apparatus 7.

While the position light-integrated blinker apparatus has been described with reference to a specific embodiment, it will be understood that various changes in form and detail may be made without departing from the spirit and scope of the invention. For example, the light guide member 70 and the position light light-emitting region 87, which is formed by the light guide member 70, are each not necessarily required to have a substantially annular shape. The light guide member 70 and the position light light-emitting region 87 may each have, for example, a hollow substantially elliptical shape, a hollow substantially rectangular shape, or a hollow substantially polygonal shape, and the blinker light light-emitting region 86 is surrounded by the position light light-emitting region 87. In this case, the blinker light light-emitting region 86 may have an elliptical shape, a rectangular shape, a polygonal shape, or the like to correspond to the shape of the position light light-emitting region 87. The outer lens 80 may be shaped in a front view to correspond with the foregoing shapes.

REFERENCE SIGNS LIST

1: motorcycle (saddle riding vehicle)
7: position light-integrated blinker apparatus
91, 92: position-light light sources
90: blinker-light light source
40: housing
87: position light light-emitting region
86: blinker light light-emitting region
70: light guide member
28: arm
60: substrate
80: outer lens
82: position light transmission portion
81: blinker light lens portion
83: concave portion
74: light introduction portion
73: circumferential bottom portion
71: substantially torus-shaped portion
75: reflection concave portion
741, 742: light introduction surfaces

The invention claimed is:

1. A position light-integrated blinker apparatus for a saddle riding vehicle, said apparatus comprising:
a blinker-light light source;
a plurality of position-light light sources including a first light source and a second light source; and
a housing which houses both the blinker-light light source and the position-light light sources,
a light guide member facing the position-light light sources and having an annular shape in a front view,
wherein:
the position-light light sources and the blinker-light light source are disposed on a shared substrate,
the first light source and the second light source are disposed on opposite ends of a diameter of a circle formed by the light guide member,
a position light light-emitting region, formed by illumination of the position-light light sources, surrounds a blinker light light-emitting region formed by illumination of the blinker-light light source, and
the light guide member is configured to be irradiated with light from the position-light light sources to thereby form the position light light-emitting region.

2. The position light-integrated blinker apparatus according to claim 1, wherein the first light source, the second light source, and the blinker-light light source are disposed linearly side by side so as to extend in parallel with an arm that is configured to support the position light-integrated blinker apparatus on a vehicle body.

3. The position light-integrated blinker apparatus according to claim 1, wherein the blinker-light light source is disposed at a center of the circle formed by the light guide member.

4. The position light-integrated blinker apparatus according to claim 3, wherein the first light source, the second light source, and the blinker-light light source are disposed linearly side by side so as to extend in parallel with an arm that is configured to support the position light-integrated blinker apparatus on a vehicle body.

5. A position light-integrated blinker apparatus for a saddle riding vehicle, said apparatus comprising:
a blinker-light light source;
a plurality of position-light light sources;
an outer lens that includes a position light transmission portion configured to be irradiated with light from the position-light light sources and a blinker light lens portion configured to be irradiated with light from the blinker-light light source, and
a housing which houses both the blinker-light light source and the position-light light sources,
wherein:
a position light light-emitting region formed by illumination of the position-light light sources surrounds a blinker light light-emitting region formed by illumination of the blinker-light light source, and
the blinker light lens portion, being formed at a position closer to a light source in an irradiation direction than the position light transmission portion, results in a concave portion being formed by the blinker light lens portion on a side of a front surface of the outer lens.

6. A position light-integrated blinker apparatus for a saddle riding vehicle, said apparatus comprising:
a blinker-light light source;
a plurality of position-light light sources;
a light guide member facing the position-light light sources and having an annular shape in a front view, and
a housing which houses both the blinker-light light source and the position-light light sources,
wherein:
a position light light-emitting region formed by illumination of the position-light light sources surrounds a blinker light light-emitting region formed by illumination of the blinker-light light source,
the light guide member is configured to be irradiated with light from the position-light light sources to thereby form the position light light-emitting region;
the light guide member includes a light introduction portion, a circumferential bottom portion, and a substantially torus-shaped portion,
the light introduction portion is disposed to face the respective position-light light sources and to receive incident light from the respective position-light light sources incident upon the light introduction portion,
the circumferential bottom portion is configured to reflect the incident light toward an anterior side in the vehicle, and
the substantially torus-shaped portion is configured so as to emit the reflected light toward the anterior side in the vehicle of the light guide member.

7. The position light-integrated blinker apparatus according to claim 6, wherein
the substantially torus-shaped portion has a reflection concave portion formed at a position facing the light introduction portion, and
the incident light incident upon the light introduction portion is reflected by the reflection concave portion and directed toward the circumferential bottom portion.

8. A position light-integrated blinker apparatus for a saddle riding vehicle, said apparatus comprising:
a blinker-light light source;
a plurality of position-light light sources;

a light guide member facing the position-light light sources and having an annular shape in a front view, and a housing which houses both the blinker-light light source and the position-light light sources wherein:

a position light light-emitting region formed by illumination of the position-light light sources surrounds a blinker light light-emitting region formed by illumination of the blinker-light light source, the light guide member is configured to be irradiated with light from the position-light light sources to thereby form the position light light-emitting region;

the light guide member includes a light introduction portion, the light introduction portion is disposed to face the respective position-light light sources and so as to receive light from the respective position-light light sources incident upon the light introduction portion, the light guide member is formed, in a portion that guides the light from the position-light light sources, to be symmetric about a plane, and, to introduce the light from the position-light light sources incident upon the light introduction portion to each of a first side and a second side of the plane-symmetric shape, the light introduction portions each have light introduction surfaces that are inclined toward the first side or the second side.

9. The position light-integrated blinker apparatus according to claim 6, wherein the light guide member includes the light introduction portion, the light guide member is formed, in a portion that guides the light from the position-light light sources, to be symmetric about a plane, and, to introduce the light from the position-light light sources incident upon the light introduction portion to each of a first side and a second side of the plane-symmetric shape, the light introduction portions each have light introduction surfaces that are inclined toward the first side or the second side.

\* \* \* \* \*